United States Patent
Philipps

(10) Patent No.: US 8,276,457 B2
(45) Date of Patent: Oct. 2, 2012

(54) PRESSURE SENSOR AND PRESSURE DIFFERENCE SENSOR

(75) Inventor: Michael Philipps, Lorrach (DE)

(73) Assignee: Endress + Hauser GmbH + Co., KG, Marlburg (DE)

( * ) Notice: Subject to any disclaimer, the term of this patent is extended or adjusted under 35 U.S.C. 154(b) by 42 days.

(21) Appl. No.: 13/029,644

(22) Filed: Feb. 17, 2011

(65) Prior Publication Data

US 2011/0203380 A1 Aug. 25, 2011

(30) Foreign Application Priority Data

Feb. 19, 2010 (DE) .......................... 10 2010 002 157

(51) Int. Cl.
*G01L 13/02* (2006.01)
(52) U.S. Cl. ............................................. 73/716; 73/736
(58) Field of Classification Search ............. 73/700–756
See application file for complete search history.

(56) References Cited

U.S. PATENT DOCUMENTS

| 7,137,304 B2 * | 11/2006 | Martin ............................. 73/756 |
| 7,798,007 B2 * | 9/2010 | Dannhauer et al. ............. 73/715 |
| 2006/0207333 A1 * | 9/2006 | Martin ............................. 73/706 |
| 2008/0042863 A1 | 2/2008 | Hedtke |
| 2009/0301209 A1 * | 12/2009 | Dannhauer et al. ............. 73/715 |
| 2011/0113889 A1 * | 5/2011 | Funken et al. ................... 73/715 |

FOREIGN PATENT DOCUMENTS

| DE | 103 19 417 A1 | 11/2004 |
| DE | 10 2008 019 054 A1 | 11/2009 |
| EP | 0 737 305 B1 | 10/1996 |

OTHER PUBLICATIONS

Search Report from the EPO.

* cited by examiner

*Primary Examiner* — Andre Allen
(74) *Attorney, Agent, or Firm* — Bacon & Thomas, PLLC

(57) ABSTRACT

A pressure sensor includes a hydraulic path filled with a pressure transfer liquid and a pressure transducer having a pressure sensitive deformation body. The hydraulic path includes a channel which extends from a pressure input opening at least to the deformation body, wherein the pressure input opening is spaced a separation distance from the deformation body, and wherein pressure on the deformation body deviates from pressure at the pressure input opening by the difference of the hydrostatic pressure of the pressure transfer liquid between the pressure input opening and the deformation body. The pressure sensor further includes an inclination sensor for determining at least one inclination value dependent on the inclination of the hydraulic path, and a processing circuit, which is suitable to determine the difference of the hydrostatic pressure of the pressure transfer liquid between the pressure input opening and the deformation body as a function of inclination value, a density value of the pressure transfer liquid and a separation distance.

14 Claims, 3 Drawing Sheets

PRESSURE SENSOR AND PRESSURE DIFFERENCE SENSOR

TECHNICAL FIELD

The present invention relates to a pressure sensor and a pressure difference sensor.

BACKGROUND DISCUSSION

A pressure difference sensor, especially pressure sensors have at least one hydraulic path and a pressure transducer having a pressure sensitive deformation body, wherein the hydraulic path includes a channel, which extends from a pressure input opening at least to the deformation body via a solid body or a solid body composite material and which is filled with a pressure transfer liquid, wherein the pressure input opening is spaced from the deformation body by a separation distance, and wherein pressure existing on the deformation body deviates from the pressure existing at the input opening by the difference of the hydrostatic pressure of the pressure transfer liquid between the pressure input opening and the deformation body. This difference can lead to significant relative measurement errors, especially in the case of sensors with small measuring ranges.

SUMMARY OF THE INVENTION

It is consequently the object of the present invention to provide a pressure sensor or pressure difference sensor which recognizes this difference of the hydrostatic pressure and can correct the measured value correspondingly.

According to the invention, the object is achieved by a pressure sensor including at least one hydraulic path and a pressure transducer having a pressure sensitive deformation body, especially a pressure sensitive measuring membrane, wherein the hydraulic path includes a channel, which extends from a pressure input opening at least to a surface of the deformation body through a solid body or a solid body composite material and which is filled with a pressure transfer liquid; wherein the pressure input opening is spaced from the deformation body by a separation distance; and wherein the pressure existing on the surface of the deformation body deviates from the pressure presiding at the pressure input opening by the difference of the hydrostatic pressure of the pressure transfer liquid between the pressure input opening and the deformation body; wherein the pressure sensor according to the invention furthermore includes an inclination sensor for determining at least one inclination value dependent on inclination of the hydraulic path, and a processing circuit, wherein the processing circuit is suitable to determine the difference of the hydrostatic pressure of the pressure transfer liquid between the pressure input opening and the deformation body as a function of the inclination value, and as a function of a value of the density of the pressure transfer liquid and a value representing the separation distance.

The pressure transducer can be arranged especially in a transducer chamber, into which a pressure output opening of the hydraulic path opens, via which the deformation body communicates with the hydraulic path.

The inclination of the hydraulic path can especially be the angle between a straight connecting line between the pressure input opening and the deformation body, on the one hand, and a reference on the other hand. The reference is, for example, a horizontal plane or a vertical axis. With respect to a horizontal plane, the inclination varies between +90° and −90°. With respect to a vertical axis, the inclination can have values between 0° and 180°.

The inclination value, dependent on the inclination of the hydraulic path, can especially be the inclination of the hydraulic path. In given cases, the inclination value can be tilted relative to the tilt angle of the inclination of the hydraulic path, so that, for determining the actual inclination of the hydraulic path, the inclination value is corrected by the tilt angle.

The value representing the separation distance can be, on the one hand, the separation distance itself, or another value that deviates from it by no more than 16%, preferably not more than 8%, further preferably no more than 4% and especially preferably no more than 2%.

In a further development of the invention, the processing circuit is suitable to correct the registered pressure of the pressure sensor by the ascertained difference of the hydrostatic pressure between the opening and the deformation body.

In a further development of the invention, the pressure sensor includes at least one temperature sensor, wherein the processing circuit is suitable to determine a current value of the density of the pressure transfer liquid based on the current measured temperature of at least one temperature sensor.

In a further development of the invention, the pressure sensor includes at least a second temperature sensor for registering a temperature at a second position which is spaced from the position of the first temperature sensor, wherein the processing circuit is suitable to determine a current value for an average density of the pressure transfer liquid based on a measured value from the first temperature sensor and a measured value of temperature from the second temperature sensor.

In another further development of the invention, the temperature sensor includes a resistance element with a temperature dependent resistor, wherein the resistance element extends between the opening and the deformation body along the hydraulic path at least 50%, especially at least 75% and preferably at least 85% of the length of the hydraulic path, so that the resistance value of the resistance element depends on the temperature curve along the hydraulic path, wherein the processing circuit is suitable to determine a current value for an average density of the pressure transfer liquid based on the output signal of the temperature sensor.

In a further development of the invention, the pressure sensor includes at least one isolating diaphragm which is connected pressure tightly along its periphery, forming a pressure chamber with the surface of the measuring mechanism platform, wherein the isolating diaphragm spans the pressure input opening.

In a further development of the invention, the processing circuit is suitable to ascertain a temperature dependent, isolating diaphragm error due to the deflection of the isolating diaphragm as a function of a signal of at least one temperature sensor, wherein the isolating diaphragm error describes a pressure difference between the pressure acting on the outside of the isolating diaphragm and the pressure reigning in the pressure chamber.

The correction of the pressure registered by the deformation body by the difference of the hydrostatic pressure of the pressure transfer liquid and, in given cases, the isolating diaphragm error, can be done simultaneously with compensation of temperature dependencies and, in given cases, position dependencies of a pressure transducer or in one or more subsequent correction steps.

In a further development of the invention, the inclination sensor is provided to ascertain the inclination as a deviation of a straight connecting line between the pressure input opening and the deformation body from a vertical axis or a horizontal plane.

In a further development, the pressure sensor can have an inclination sensor, which is suitable to perform a two dimensional or a three-dimensional position registering. A two dimensional position registering can describe, for example, firstly, the inclination of the hydraulic path relative to a vertical axis, and secondly, an angle of rotation of the pressure sensor from another axis, for example, the axis defined by the hydraulic path between pressure input opening and deformation body. A three-dimensional position registering can still supplementally determine, for example, a direction of the projection of the axis described by the hydraulic path onto a horizontal plane.

In a further development of the invention, the evaluating unit stores at least the first measured value of inclination of the pressure sensor, especially of the hydraulic path, and compares the current measured values of inclination with the first measured value, and gives an alarm signal in the case of changes of the measured value of inclination.

A pressure difference sensor of the invention includes: a pressure transducer having a first surface of a pressure sensitive deformation body, and a second surface of a pressure sensitive deformation body; a first hydraulic path wherein the first hydraulic path includes a channel, which extends from a first pressure input opening to at least the first surface through a solid body or a solid body composite material and which is filled with a pressure transfer liquid, wherein the first pressure input opening is spaced from the first surface deformation body by a first separation distance, a second hydraulic path, wherein the second hydraulic path includes a channel, which extends from a second pressure input opening at least to the second surface through a solid body or a solid body composite material and which is filled with a pressure transfer liquid, wherein the first pressure input opening is spaced from the first surface by a first separation distance, wherein the pressure existing at the first surface deviates from the pressure presiding at the first pressure input opening by the difference of the hydrostatic pressure of the pressure transfer liquid between the first pressure input opening and the first surface; wherein the second pressure input opening is spaced from the second surface by a second separation distance, wherein the pressure existing at the second surface deviates from the pressure presiding at the second pressure input opening by the difference of the hydrostatic pressure of the pressure transfer liquid between the second pressure input opening and the second surface; characterized in that the pressure sensor furthermore includes an inclination sensor for determining inclination of the first hydraulic path and inclination of the second hydraulic path and a processing circuit, wherein the processing circuit is suitable to determine differences of the hydrostatic pressure of the pressure transfer liquid between the first pressure input opening and the first surface as well as between the second pressure input opening and the second surface as a function of the inclination of the first hydraulic path, and the inclination of the second hydraulic path, as a function of a value for the density of the pressure transfer liquid as well as values representing the first separation distance and the second separation distance and/or a difference of the hydrostatic pressure of the pressure transfer liquid between the first pressure input opening and the second pressure input opening.

In a first further development of the invention, the pressure difference sensor includes a pressure transducer having a measuring membrane, wherein the first surface is arranged on a first side of the measuring membrane, and wherein the second surface is arranged on a second side of the measuring membrane lying opposite the first side.

In a first further development of the invention, the pressure difference sensor includes a pressure transducer having a first measuring membrane and a second measuring membrane, wherein the first measuring membrane has the first surface and the second measuring membrane has the second surface, and wherein the first and second measuring membrane are coupled via a tie rod or a coupling medium, so that a pressure loading of the first surface counteracts a pressure loading of the second surface.

BRIEF DESCRIPTION OF THE DRAWINGS

The invention will now be explained based on an example of an embodiment illustrated in the drawing, the figures of which show as follows.

DETAILED DISCUSSION IN CONJUNCTION WITH THE DRAWINGS

Figure 1:
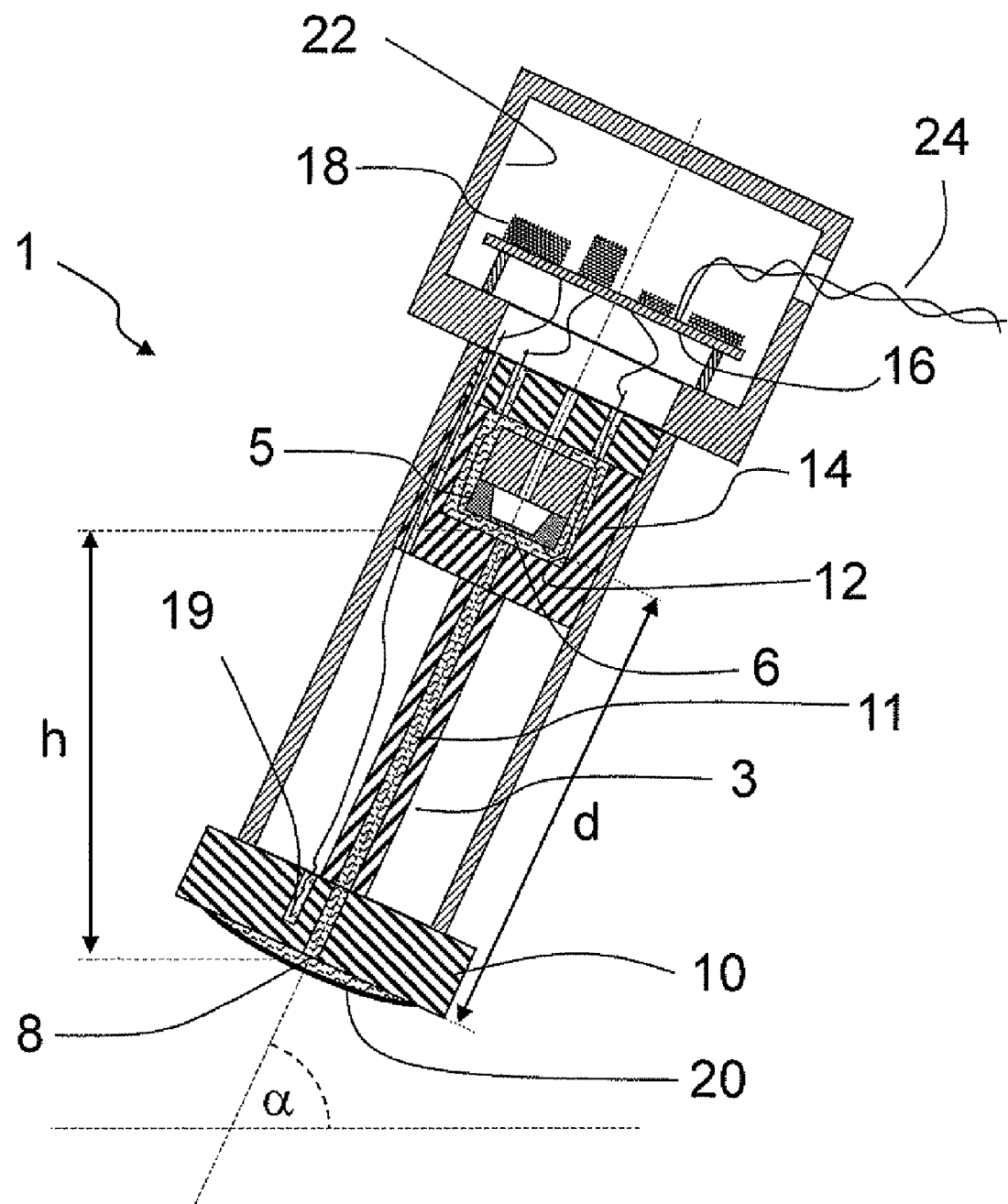
FIG. 1 is a longitudinal section through a pressure sensor of the invention.

The pressure sensor 1 shown in FIG. 1 includes a hydraulic path 3, which extends to a pressure measuring cell 5, in order to supply measuring membrane 6, serving as deformation body, with a pressure, wherein the hydraulic path 3 extends from a pressure inlet opening 8 in a process connection body 10 via a capillary line 11 to a pressure transducer chamber 12, which is embodied in a pressure transducer housing 14.

The pressure transducer housing 14, the process connection body 10 and the capillary line 11 are preferably stainless steel, wherein the pressure sensor 5 in the example of an embodiment is a semiconductor pressure sensor, which has piezo-resistive elements in its measuring membrane 6 which are embodied in a full bridge circuit. The pressure sensor includes furthermore an evaluation circuit 16 which is connected to the pressure sensor 5, wherein the evaluation circuit furthermore has an inclination sensor 18, which is suitable to ascertain the angle of inclination a of the longitudinal axis of the pressure sensor from a horizontal plane. From the angle of inclination a and a value stored in the evaluation circuit for the distance d between the isolating diaphragm 6 and the pressure inlet opening 8, it follows that for the height difference h between the measuring membrane 6 and the pressure inlet opening 8 is $$h = d * \sin(\alpha).$$

In order to ascertain the hydrostatic pressure difference between the pressure input opening 8 and the measuring membrane 6, the ascertained height value is still to be multiplied with the current density of the pressure transfer liquid in the hydraulic path 3. The density shows a strong dependence on temperature due to the thermal expansion of the pressure transfer liquid, so that a temperature measurement is required to determine the density. For this purpose, the pressure sensor of the invention includes a first temperature sensor 19, which is arranged in a blind bore in the process connection body 10 near the input opening 8 of the hydraulic path and which is connected to the evaluation circuit 16. Besides the first temperature measured value $T_1$ of the first temperature sensor, a second temperature measured value $T_2$ for the pressure transfer liquid is determined by means of a temperature sensor, which is arranged near the pressure measuring cell or integrated in the pressure measuring cell. In the case of the present example of an embodiment the full bridge circuit of the measuring membrane serves as a second temperature sensor, wherein its temperature measured value is obtained from the longitudinal resistance value of the full bridge circuit of the measuring membrane 6.

An (on occasion, weighted) average value T of the first measured value of temperature $T_1$ and of the second measured value of temperature $T_2$ with $$T = a*T_1 + (1-a)*T_2,$$

wherein $0 < a < 1$, especially $0.25 < a < 0.75$, for example, $a = 0.5$, is used for calculating the current density of the pressure transfer liquid according to the equation $$\rho(T) = \rho(T_0)/[1 + \gamma*(T - T_0)]$$

Wherein, $\rho(T_0)$ is the density at a reference temperature $T_0$, especially room temperature, and wherein $\gamma$ is the volume expansion coefficient of the pressure transfer liquid.

The difference of the hydrostatic pressure $\Delta p$ between the pressure input opening 8 and the measuring membrane 6 then results from the following equation:

$$\Delta p = \rho(T)*g*h$$
$$= \rho(T_0)/[1 + \gamma*(T - T_0)]*g*d*\sin(\alpha).$$

The pressure sensor includes furthermore an isolating diaphragm 20, which is secured to the end face of the process connection body 10 along an encircling edge, and which spans the pressure inlet opening 8. The isolating diaphragm 20 is sufficiently flexible to absorb the volume fluctuations of the pressure transfer liquid due to the thermal expansion of such, however, an isolating diaphragm error on the order of magnitude of, for instance, 0.1 mbar/μl is nevertheless associated therewith.

A temperature average value can also be taken into consideration for the compensation of this error, wherein instead of the above defined temperature average value a differently weighted average value $T_m$ can also be applied, which takes into consideration, for example, the volume of the pressure transfer liquid in the pressure sensor chamber 12 relative to the volume of the pressure transfer liquid under the isolating diaphragm.

$$T_m = b*T_1 + (1-b)*T_2$$

In given cases, the coefficient b has a temperature-dependence, in order to take into consideration the variable volume fractions under the isolating diaphragm, for example, $$b = b_0/[1 + \gamma*(T_1 - T_0)].$$

The isolating diaphragm error $\Delta p_m$ can then be estimated, for example, by the following equation:

$$\Delta p_m = A_0 + A_1*(T_m - T_0) + A_3*(T_m - T_0)^3,$$

wherein the coefficients $A_i$ are, for example, empirically ascertained.

Firstly, the evaluation circuit 16 compensates for the temperature dependencies of the pressure sensor itself, secondly it ascertains the temperature-dependent hydrostatic pressure difference between the pressure input opening 8 and the measuring membrane 6 while taking the inclination of the axis of the pressure sensor into consideration, and thirdly it determines the isolating diaphragm error due to the temperature-dependent volume expansion of the pressure transfer liquid, which effects an elastic deformation of the isolating diaphragm. The measurement signal, for example, output via the current loop 24 represents, finally, the pressure (adjusted for the named errors) acting on the isolating diaphragm 20.

Figure 2:
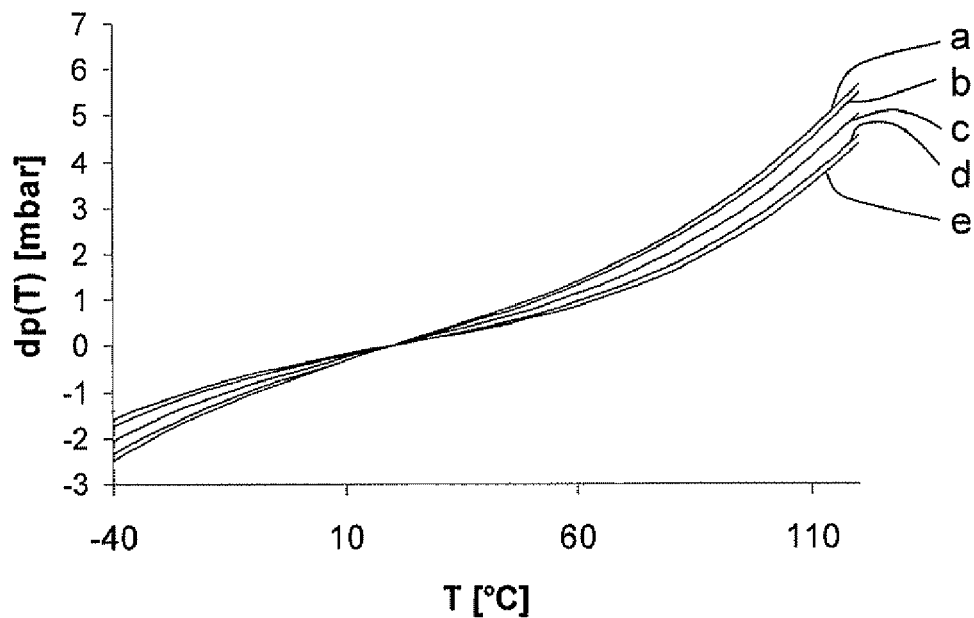
FIG. 2 shows the temperature dependent sum of the isolating diaphragm error and the difference of the hydrostatic pressure of the pressure transfer liquid for different installed positions of a pressure sensor of the invention.
Figure 3:
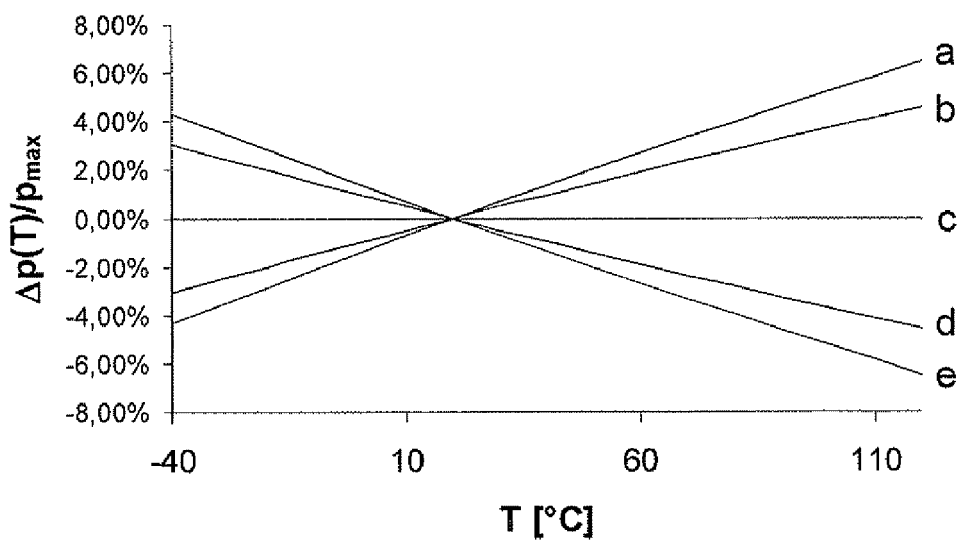
FIG. 3 shows the temperature dependent, relative measurement error of a pressure sensor of the invention having a measuring range of 10 millibars for different inclinations.

FIGS. 2 and 3 illustrate the temperature dependent measurement errors, which are corrected by the evaluation circuit, taking position into consideration. In such a case, the curves show data for the following angles of inclination: a: $\alpha = -90°$, b: $\alpha = -45°$, c: $\alpha = 0°$, d: $\alpha = 45°$, e: $\alpha = 90°$.

The global course of the cumulative temperature dependent pressure error due to the hydrostatic pressure difference and of the isolating diaphragm error is presented in FIG. 2, wherein the global course of the family of curves in FIG. 2 is dominated by the elastic deformation of the isolating diaphragm due to the thermal expansion of the pressure transfer liquid. In the case of the pressure sensor considered here, the value d for the distance between the measuring membrane, or the deformation body, and the pressure input opening has a value of 30 cm. Under consideration of the angle of inclination of the pressure sensor, this leads to the illustrated spreading of the curves. If one assumes now that the isolating diaphragm error for the pressure sensor has been determined in the case of an angle of inclination of 0 degrees, so that the isolating diaphragm error can be corrected depending on the temperature, then the inclination dependent measurement error $\Delta p$ would remain, for example, in the case of a pressure sensor with a measuring range of 10 mbar as shown in FIG. 3, after the pressure sensor has experienced a zero-point calibration at room temperature in the case of an on-site mounting. The cause of this remaining error are the temperature dependent fluctuations of the difference of the hydrostatic pressure between the pressure input opening and the measuring membrane, their measure and sign dependent on the magnitude and direction of the inclination of the pressure sensor. The pressure sensor of the invention also now enables the correction of this error. The representation of the pressure sensor in FIG. 1 is, of course, not true to scale. Thus, for example, the actual distance between the pressure input opening and the process contacting side of the isolating diaphragm 20, relative to the length of the separation d between the pressure input opening and the deformation body, or the measuring membrane, is presented too large. Equally, the distance between the end of the measuring membrane and the opening of the capillary line into the pressure sensor chamber is presented too large relative to the measure d.

This means that instead of the measure d between the pressure input opening and the measuring membrane, or the deformation body, other measures can also be used, for example, the distance between the end of the isolating diaphragm and the deformation body or the distance between the isolating diaphragm, or the pressure inlet opening, and the inner side wall of the deformation body of the pressure sensor chamber. So long as such a measure is suitable to serve as the basis for determining the height h for ascertaining the difference of the hydrostatic pressure via the hydraulic path with sufficient accuracy, it is considered as equally acting, in the sense of the invention. As seen as sufficiently exact is especially an agreement of the height h with a deviation of plus/minus 10% preferably, plus/minus 5%, further preferably plus/minus 2%, and especially plus/minus 1%.

Figure 4:
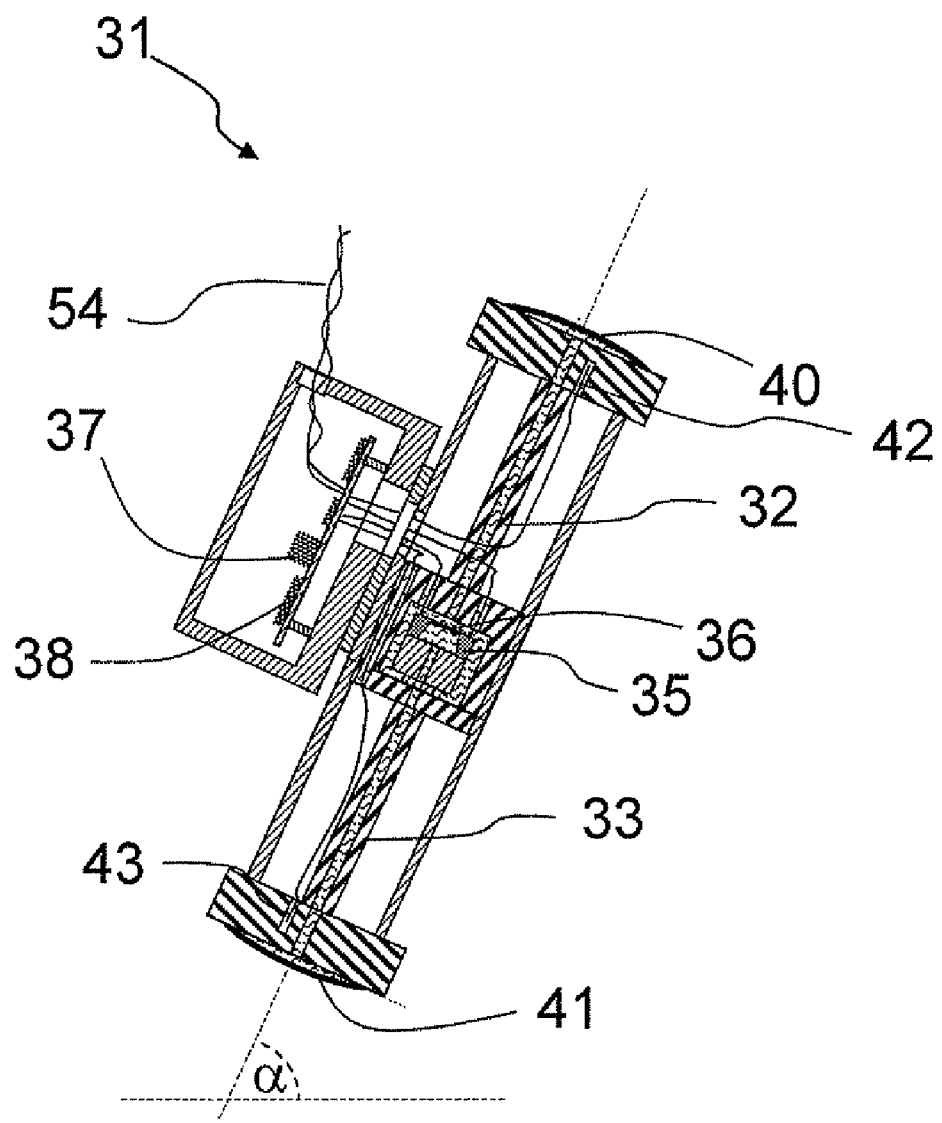
FIG. 4 is a longitudinal section of a pressure difference sensor of the invention.

The pressure difference sensor 31 shown in FIG. 4 includes a first hydraulic path 32 and a second hydraulic path 33, as well as a pressure sensor 35 with a measuring membrane 36, wherein the first hydraulic path 32 extends from a first pressure input opening to a first side of the measuring membrane 36 and the second hydraulic path 33 extends from a second pressure input opening to the second side of the measuring membrane 36. The first pressure input opening is covered by a first isolating diaphragm 40 which is contactable with a first pressure, and the second pressure input opening is covered by a second isolating diaphragm 41 which is contactable with a second pressure. Near the first isolating diaphragm, a first temperature sensor 42 is arranged and near the second isolating diaphragm, a second temperature sensor 43 is arranged, in order to register a temperature of the first, or second hydraulic path, wherein the ascertained temperature values can be taken into consideration for ascertaining the respective densities of the pressure transfer liquid in the hydraulic paths. Moreover, the temperature values imply particular volume expansions for the hydraulic paths, which and these expansions lead to first and second isolating diaphragm errors. The pressure difference sensor includes furthermore an evaluation circuit 37, which is connected to the pressure sensor 35 and the two temperature sensors 42, 43, in order to provide a conditioned difference pressure signal to an output 54, which is compensated at least as regards the internal errors of the pressure difference measuring sensor. The evaluation circuit includes therefor an inclination sensor 38, in order to determine the particular difference of the hydrostatic pressure between a pressure input opening and the measuring membrane, and, respectively, between the first and the second pressure input openings as a function of the inclination of the pressure difference measuring sensor and the respective densities of the pressure transfer liquid. Of course, the isolating diaphragm error due to the thermal expansion of the pressure transfer liquid in the respective hydraulic paths based on the temperature measured values can also be determined and be taken into consideration for the correction of the output signal.

As a result, the output signal of the pressure difference measuring sensor can output the difference between a pressure on the first isolating diaphragm and a pressure on the second isolating diaphragm.

The invention claimed is:

1. A pressure sensor, comprising:
a hydraulic path;
a pressure transducer having a pressure sensitive deformation body;
an inclination sensor for determining inclination of the hydraulic path; and
a processing circuit, wherein:
said hydraulic path includes a channel, which extends from a pressure input opening at least to a surface of said deformation body through a solid body or a solid body composite material and which is filled with a pressure transfer liquid;
said pressure input opening is spaced a separation distance from said deformation body;
the existing pressure on the surface of said deformation body deviates from the pressure presiding at said pressure input opening by the difference of the hydrostatic pressure of the pressure transfer liquid between said pressure input opening and said deformation body; and
said processing circuit is suitable to determine the difference of the hydrostatic pressure of the pressure transfer liquid between said pressure input opening and said deformation body as a function of the inclination of the hydraulic path and as a function of a value for the density of the pressure transfer liquid and a value representing the separation distance.

2. The pressure sensor as claimed in claim 1, wherein:
said processing circuit is suitable to correct registered pressure of said pressure sensor by the ascertained difference of the hydrostatic pressure between the opening and the surface of said deformation body.

3. The pressure sensor as claimed in claim 1, further comprising:
at least one temperature sensor, wherein:
said processing circuit is suitable to determine a current value of the density of the pressure transfer liquid, based on a current temperature measured value of said at least one temperature sensor.

4. The pressure sensor as claimed in claim 3, further comprising:
at least a second temperature sensor for registering a temperature at a second position spaced from the position of said first temperature sensor; and wherein:
said processing circuit is suitable to determine a current value for an average density of the pressure transfer liquid based on a measured value of said first temperature sensor and a measured value of temperature of said second temperature sensor.

5. The pressure sensor as claimed in claim 3, wherein:
said temperature sensor is a resistance element having a temperature dependent resistor;
said resistance element extends along the hydraulic path between the opening and said deformation body at least 50%, especially at least 75% and preferably at least 85% of the length of the hydraulic path, so that the resistance value of said resistance element depends on the temperature curve along the hydraulic path; and
said processing circuit is suitable to determine a current value for an average density of the pressure transfer liquid, based on an output signal of said temperature sensor.

6. The pressure sensor as claimed in claim 1, further comprising:
at least one isolating diaphragm which is connected pressure tightly along its periphery, forming a pressure chamber with the surface of a measuring mechanism platform, wherein:
said isolating diaphragm spans the opening.

7. The pressure sensor as claimed in claim 3, wherein:
said processing circuit is suitable to ascertain, as a function of a signal of at least one temperature sensor, a temperature dependent isolating diaphragm error due to deflection of an isolating diaphragm;
the isolating diaphragm error describes a pressure difference between the pressure acting on the outside of said isolating diaphragm and the pressure reigning in said pressure chamber.

8. The pressure sensor as claimed in claim 1, wherein:
said inclination sensor is provided to ascertain inclination as a deviation from a vertical axis or a horizontal plane of a straight connecting line between the pressure input opening and the surface of said deformation body.

9. The pressure sensor as claimed in claim 7, wherein:
said inclination sensor performs a two dimensional or a three dimensional position registering.

10. The pressure sensor as claimed in claim 1, wherein:
said evaluating unit stores a first inclination measured value for the inclination of said pressure sensor and compares current inclination measured values with the first measured value, and outputs an alarm signal in the case of changes of the inclination measured value.

11. The pressure sensor as claimed in claim 1, wherein:
said pressure sensor is an absolute pressure sensor or a relative pressure sensor.

12. A pressure difference sensor, comprising:
a pressure transducer having a first surface of a pressure sensitive deformation body and a second surface of a pressure sensitive deformation body;
a first hydraulic path,
an inclination sensor for determining inclination of the first hydraulic path and inclination of the second hydraulic path; and
a processing circuit, wherein:
said first hydraulic path includes a channel which extends from a first pressure input opening at least to the first surface through a solid body or a solid body composite material and which is filled with a pressure transfer liquid;
said first pressure input opening is spaced from the first surface of said pressure sensitive deformation body by a first separation distance, a second hydraulic path;
said second hydraulic path includes a channel, which extends from a second pressure input opening at least to the second surface through a solid body or a solid body composite material and which is filled with a pressure transfer liquid;
said first pressure input opening is spaced from the first surface by a first separation distance;
the pressure existing on the first surface deviates from pressure presiding at the first pressure input opening by the difference of the hydrostatic pressure of the pressure transfer liquid between the first pressure input opening and the first surface;
said second pressure input opening is spaced from the second surface by a second separation distance;
the pressure existing on the second surface deviates from the pressure presiding on the second pressure input opening by the difference of the hydrostatic pressure of the pressure transfer liquid between the second pressure input opening and the second surface;
said processing circuit is suitable to determine differences of hydrostatic pressure of the pressure transfer liquid between the first pressure input opening and the first surface as well as between the second pressure input opening and the second surface and/or a difference of the hydrostatic pressure of the pressure transfer liquid between the first pressure input opening and the second pressure input opening, as a function of inclination of the first hydraulic path and the inclination of the second hydraulic path as a function of a value for density of the pressure transfer liquid as well as values representing the first separation distance and the second separation distance.

13. The pressure difference sensor as claimed in claim 12, wherein:
said pressure sensor has a measuring membrane,
a first surface is arranged on a first side of said measuring membrane, and
a second surface is arranged on a second side of said measuring membrane, which lies opposite the first side.

14. The pressure difference sensor as claimed in claim 12, wherein:
said pressure sensor has first and second measuring membranes;
said first measuring membrane is the first surface and said second measuring membrane is the second surface; and
said first and said second measuring membranes are coupled via a tie rod or a coupling medium, so that the pressure loading said first surface counteracts a pressure loading of said second surface.

* * * * *